United States Patent [19]
Densham et al.

[11] Patent Number: 5,881,077
[45] Date of Patent: Mar. 9, 1999

[54] DATA PROCESSING SYSTEM

[75] Inventors: Rodney Hugh Densham, Charlbury; William Kentish, Chipping Norton; Peter Charles Eastty, Oxford; Conrad Charles Cooke, Witney, all of United Kingdom

[73] Assignees: Sony Corporation, Tokyo, Japan; Sony United Kingdom Limited, Weybridge, England

[21] Appl. No.: 845,559

[22] Filed: Apr. 24, 1997

Related U.S. Application Data

[62] Division of Ser. No. 598,537, Feb. 8, 1996, Pat. No. 5,740,449.

[30] Foreign Application Priority Data

Feb. 23, 1995 [GB] United Kingdom .................... 9503668

[51] Int. Cl.$^6$ ............................................. G06F 11/00
[52] U.S. Cl. ........................................... 371/49.1; 371/5.1
[58] Field of Search ................................. 371/5.1, 5.4, 48, 371/49.1, 49.2, 37.7, 5.5, 57.1, 57.2; 364/265, 266.3, 266.1, 265.1, 265.2, 944.5, 945.6; 395/185.05, 185.01

[56] References Cited

U.S. PATENT DOCUMENTS

| | | | |
|---|---|---|---|
| 4,295,219 | 10/1981 | Draper et al. .......................... | 371/51.1 |
| 4,688,207 | 8/1987 | Yoshimoto ............................... | 371/5.1 |
| 4,866,713 | 9/1989 | Worger ................................. | 395/185.08 |
| 5,606,662 | 2/1997 | Wisor .................................... | 371/49.2 |
| 5,678,005 | 10/1997 | Taylor ................................... | 371/49.2 |

*Primary Examiner*—Trinh L. Tu
*Attorney, Agent, or Firm*—Frommer Lawrence & Haug, LLP.; William S. Frommer

[57] ABSTRACT

A method and apparatus is provided for generating an interrupt signal in a data processing system, the interrupt signal being supplied to a control processor of the system to indicate the occurrence of any of a plurality of predetermined events in the system. The method and apparatus operate by: writing data to at least one memory location of a plurality of pairs of memory locations A,B of the system in dependence upon the event to be indicated, the pairs of memory locations A,B being predefined in the system for respective ones of the events; reading data from the pairs of memory locations A,B; processing the data read from each pair of memory locations A,B to generate interrupt data indicative of whether the associated event has occurred, and if so transmitting an interrupt signal to the control processor; and writing the interrupt data corresponding to the events to respective third memory locations C, the third memory locations C being predefined in the control processor for the said events. On receipt of an interrupt signal, the control processor reads the interrupt data in the third memory locations C to determine the event indicated by the interrupt signal.

7 Claims, 9 Drawing Sheets

| OP CODE | CONTROL | Add 7a | Add 7b | Add 7c | Write Add |
|---|---|---|---|---|---|
| 8 | 12 | 7 | 7 | 7 | 7 |

*FIGURE 4*

| TICK NO | SPIC A | H BUS | SPIC C |
|---|---|---|---|
| 0 | INSTN 0 (OUT H) | | INSTN 0 (IN H) |
| 1 | Add Calc | | P2 |
| 2 | Data Read | | P3 |
| 3 | H OUT Reg | | P4 |
| 4 | | ✓ | (P5) |
| 5 | | | H IN Reg |
| 6 | | | Parity Check |
| 7 | | | Data Write |

*FIGURE 5*

DATA PROCESSING SYSTEM

This application is a division of application Ser. No. 08/598,537, filed Feb. 8, 1996, now U.S. Pat. No. 5,740,449.

BACKGROUND OF THE INVENTION

Field of the Invention

The present invention relates generally to data processing systems. Aspects of the invention are concerned with the detection and/or indication of events which may occur during operation of such systems and the timing of operations performed by such systems.

The various aspects of the invention can be applied, though not exclusively, in the field of digital audio data processing such as may be performed by the signal processing rack in an audio recording studio. The invention will be illustrated hereinafter with particular reference to such an application, though it is to be appreciated that the invention can be applied to other data processing systems.

In an audio recording studio, as illustrated by the simplified block diagram of FIG. 1, the signal processing rack 1 communicates with an operator console 2 and, as indicated by the LINK & I/O block 3, is also connected into the studio network for communication of audio and control data between the signal processing rack and the various input/output devices, e.g. speakers, microphones, DATs etc., connected to the network link. Operation of the network is controlled at the console, or mixing desk, 2, communication of data between devices in the network and implementation of the necessary processing by the signal processing rack being performed in response to operation of the console controls.

The signal processing rack 1 can be considered to be divided into a control side, which is responsive to the status of the various controls on the console 2, and an audio processing side which implements the required audio processing functions in dependence upon the control settings and communicates audio data with the network devices via the link.

In one example of a signal processing rack 1 to which the invention can be applied, the processing of digital audio data is performed by a parallel processing array as illustrated schematically in FIG. 2 of the accompanying drawings. FIG. 2 shows an array of eight signal processing integrated circuits (SPICs) 4 labelled A to F. The SPICs, or data processors, 4 are arranged at least electrically in a rectangular array, each SPIC being connected to a horizontal data bus H and a vertical data bus V. Each SPIC 4 is arranged for communication of data with each of the two buses to which it is connected, each of the horizontal and vertical buses H,V being shared by a number of SPICs 4.

The parallel processing array as a whole of course consists of a substantially greater number of SPICs than shown in FIG. 2. The SP rack 1 in fact includes up to 16 cards, each card carrying an array of, for example, eight SPICs. The horizontal and vertical buses are connected between cards, so that, electrically, the SPICs form one large rectangular array. The buses may be connected in a loop, with periodic pipeline registers, for example every four cards, to allow bi-directional communication around the loop and extend the processing power of the array.

The SPICs 4 in the array run synchronously, each SPIC performing a sequence of operations in each audio sample period in accordance with an instruction sequence stored in an internal memory. The SPICs are pre-programmed with the instruction sequences at set-up so that all possible required processing operations can be implemented by the array. In one particular example, each SPIC is preprogrammed with 512 instructions, successive instructions being read from the internal memories for implementation by the SPICs in successive cycles of a clock signal. A control processor (not shown) is provided on each card for controlling various aspects of the operation of the SPICs on that card. In operation, the SPICs run synchronously through their instruction sequences under control of the control processors, the control processors being responsive to the operator console 2 to cause the SPICs to implement the various processing operations as required.

During operation of the system, it is necessary for the control processor controlling an array of SPICs to be alerted to the occurrence of certain events, eg the occurrence of an error condition such as a signal overload or a parity error. As a further example, part of the pre-programmed operation of some of the SPICs may be to implement timers for various purposes, eg to set the time for which an indicator is to be lit on the operator console, and the control processor must be alerted to the expiry of such timers to perform the appropriate control function. The SPICs can of course be configured to transmit signals to the control processor on occurrence of such events. However, since each SPIC performs numerous (eg many hundred) processing operations in each audio sampling period, the tasks of generating such signals and identifying the sources of the signals must be implemented as simply and efficiently as possible if overall efficiency of the processing system is to be achieved.

As part of their operation, the SPICs need to able to process audio data in accordance with control signals received by the control processor from the operator console 2 indicating the setting of the various console controls. For example, if a control setting for signal level is changed, audio signals processed by the SPICs will need to be multiplied by different values, or coefficients, to change the actual audio signal level. The sampling frequency of control signals derived from the operator console is generally considerably lower than the audio sampling frequency, e.g. 1 kHz or lower as compared with 50 kHz. Interpolation of the control signals is therefore required to obtain a gradual change in the value of coefficients over the multiple audio samples within one period of the control signal sampling frequency. To implement this, a coefficient interpolator may be associated with each SPIC. The control processor calculates coefficient data in accordance with the control signals from the console, and periodically supplies the coefficient data to the interpolator. The interpolator uses the coefficient data to derive interpolated coefficients for use by the associated SPIC. The period over which coefficients are interpolated is determined by a coefficient sampling rate signal (CSR signal) supplied to the interpolator. In practice there are a number of such CSR signals, with different clock rates, provided in the system so that interpolation can be performed in accordance with different ones of the CSR signals as required for different purposes.

In general, coefficient data calculated by the control processor will need to be supplied to more than one SPIC for updating the coefficients used in processing operations, and it is important to ensure that the new coefficient data is supplied to the relevant SPICs so that they start using the new coefficient values in the same audio sample period. For example, as part of their function the SPICs may implement various multi-tap or multi-pole filters, and updated coefficients for these filters must be introduced sample-synchronously to avoid distortion. Thus, it is necessary to provide a convenient way of timing the updates to coefficient data supplied to the interpolators.

SUMMARY OF THE INVENTION

According to one aspect of the present invention there is provided a method of generating an interrupt signal in a data processing system, the interrupt signal being supplied to a control processor of the system to indicate the occurrence of any of a plurality of predetermined events in the system, the method comprising:

writing data to at least one memory location of a plurality of pairs of memory locations of the system in dependence upon the event to be indicated, the pairs of memory locations being predefined in the system for respective ones of the events;

reading data from the pairs of memory locations;

processing the data read from each pair of memory locations to generate interrupt data indicative of whether the associated event has occurred, and if so transmitting an interrupt signal to the control processor; and writing the interrupt data corresponding to the events to respective third memory locations, the third memory locations being predefined in the control processor for the said events;

wherein, on receipt of an interrupt signal, the control processor reads the interrupt data in the third memory locations to determine the event indicated by the interrupt signal.

According to another aspect of the present invention there is provided data processing apparatus comprising:

a control processor having an interrupt input for receiving an interrupt signal indicating the occurrence of any of a plurality of predetermined events during operation of the apparatus;

memory means providing a plurality of pairs of memory locations, each pair being predefined for a respective one of said events;

means for writing data to at least one memory location of a said pair on the occurrence of the associated event;

means for reading data from the pairs of memory locations; and processing means for processing the data read from each pair of memory locations to generate interrupt data indicative of whether the associated event has occurred, and for writing the interrupt data corresponding to the events to respective third memory locations of the memory means, the processing means being arranged to transmit an interrupt signal to the interrupt input of the control processor if the interrupt data indicates the occurrence of a said event;

wherein the third memory locations are predefined in the control processor for the respective events, and wherein the control processor is arranged such that, on receipt of an interrupt signal, the control processor reads the interrupt data in the third memory locations to determine the event indicated by the interrupt signal.

By way of example, an event may be the detection of a signal overload at a particular point in the system, or the expiry of predetermined time period as indicated by a timer implemented by the system.

In embodiments of this aspect of invention, the process for actually generating an interrupt signal can be standard, involving reading data from a pair of memory locations, generating the interrupt data and transmitting an interrupt signal if prompted by the interrupt data, and writing the interrupt data to a third memory location. Whether an interrupt signal will actually be generated depends on the data written to the pairs of memory locations as a result of a previous processing operation. Moreover, since the third memory locations are associated with particular events, on receipt of an interrupt signal the control processor need only access the predefined third memory locations to determine from the interrupt data stored in these locations which event caused generation of the interrupt signal.

According to another aspect of the present invention there is provided data processing apparatus comprising an array of data processors each arranged to execute a sequence of operations in accordance with a sequence of instructions read from a program memory of the data processor in successive cycles of a clock signal, the data processors being connected for communication of data via one or more data buses, wherein each data processor includes:

a parity generator for applying parity to data output to a said bus;

a parity checker for checking the parity of data received from a said bus, and for generating an error signal on detection of a parity error; and register means arranged to store a count indicative of the cycle of the clock signal at which a parity error occurs.

In accordance with this aspect of the invention, even though the data processors may perform numerous operations in each data sampling period of the apparatus, when a parity error is detected a count indicative of the cycle of the clock signal in which the error occurred is stored in the register means, thereby greatly facilitating identification of the source of the error. The error signals may be supplied to a control processor which is arranged to read the count stored in the register means of a data processor on detection of an error signal from that processor. If the communications between data processors occurring in different cycles of the clock signal are predefined in the control processor, the control processor can then identify from the count read from the register means the particular data processor which transmitted the data containing the error.

In accordance with a further aspect of the invention there is provided data processing apparatus comprising: a plurality of data processors, each data processor including an interpolator arranged for receiving coefficient data and generating therefrom interpolated coefficients for use in processing operations of the data processor; and a control processor for generating the coefficient data supplied to the interpolators, wherein each interpolator is arranged for generating coefficients in dependence on a plurality of coefficient clock signals, which clock signals are supplied to each of the data processors, and wherein each of the data processors includes means for generating a timing interrupt signal in dependence on the state of one or more of said clock signals, the timing interrupt signals being supplied to the control processor for timing the supply of updated coefficient data to the interpolators.

Embodiments of this aspect of the invention provide convenient means by which the appropriate timing for updates to coefficient data supplied to the interpolators may be determined.

Data processing apparatus may of course embody one or more of the various aspects of the invention. Further, where features are described herein with reference to an apparatus embodying the invention, corresponding features may be provided in accordance with a method of the invention, and visa versa.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 4 illustrates the general format of an instruction word for the data processor of FIG. 3a;

FIG. 5 illustrates diagrammatically the process of data transfer between processors sharing a data bus in the array of FIG. 2;

DESCRIPTION OF THE PREFERRED EMBODIMENTS

Figure 2:
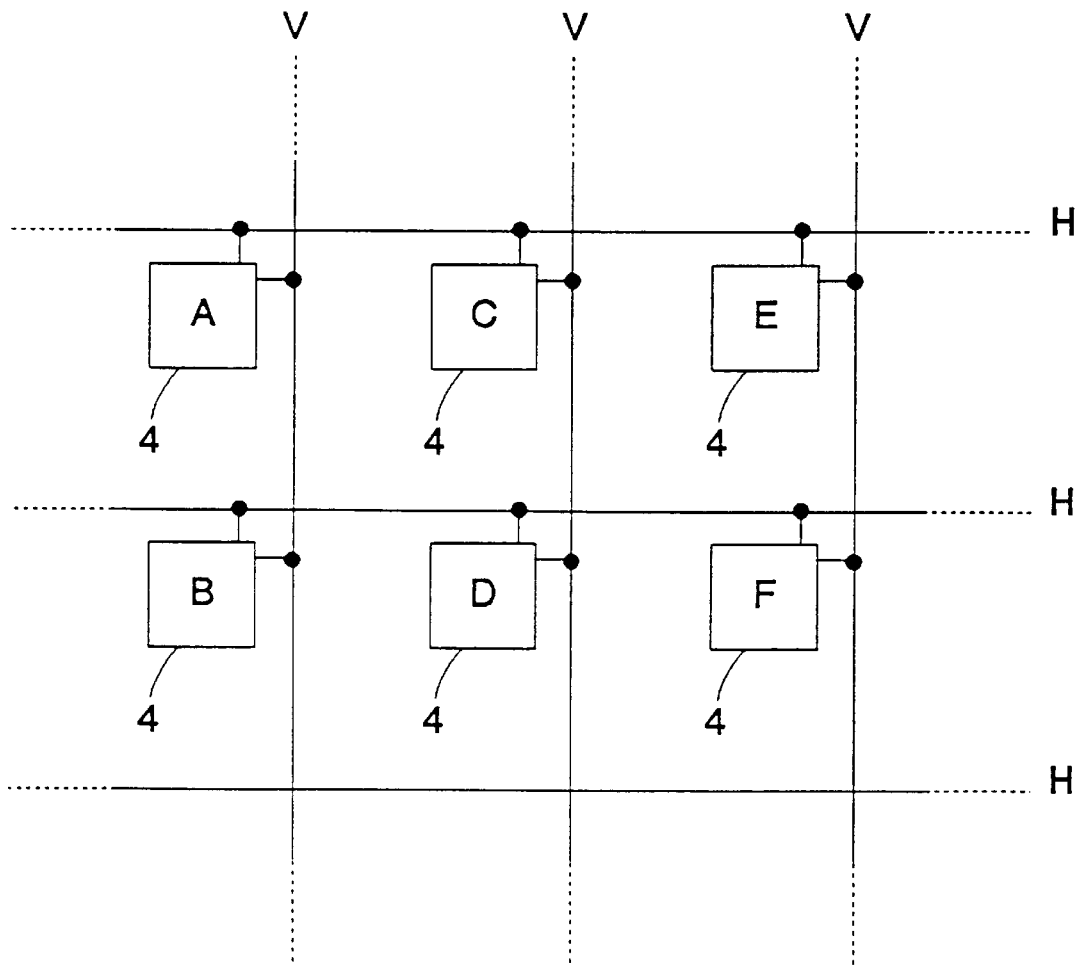
FIG. 2 is a schematic illustration of an array of data processors in the system of FIG. 1.
Figure 3A:
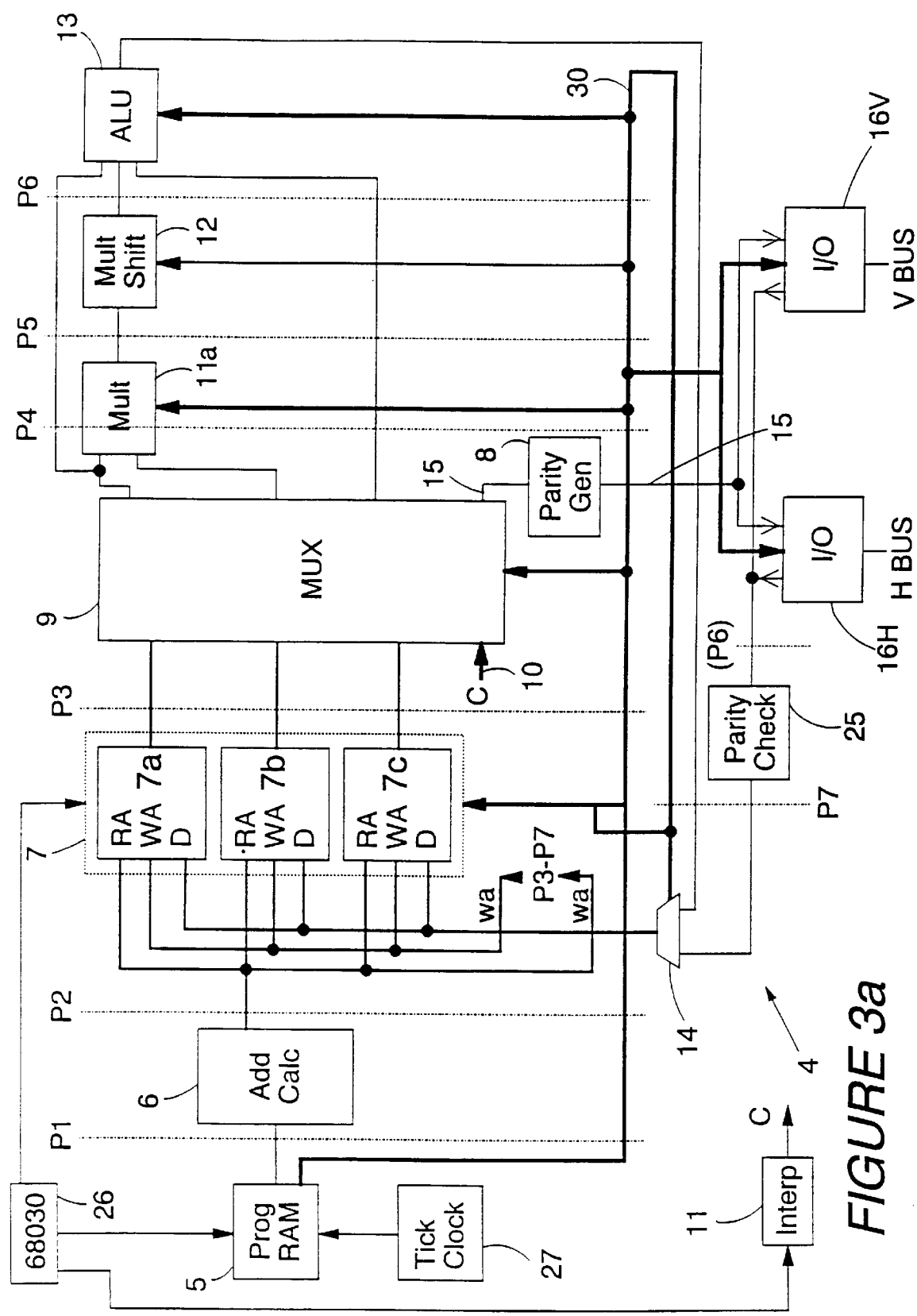
FIG. 3a is a simplified block diagram illustrating the general structure of a data processor of FIG. 2.

FIG. 3a is a simplified block diagram showing the general structure of a data processor, or SPIC, 4 in the parallel processing array of FIG. 2 to which the present invention may be applied. Before describing preferred embodiments of the invention in detail, the basic structure and operation of the SPIC 4 will be described.

The SPIC 4 comprises a program RAM 5 in which the instruction sequence for controlling operation of the SPIC is stored. The program RAM 5 is connected to an address calculator 6 which generates the address inputs for a data RAM section, indicated generally at 7, comprising three data RAMs 7a, 7b and 7c with respective read and write address inputs RA and WA and data inputs D. The three data outputs from the data RAMs 7 form three of the four inputs to an arrangement of multiplexers indicated generally by the MUX block 9. The fourth input 10 of the MUX block 9 receives coefficients (c) from an interpolator 11, as discussed further below. The MUX block 9 is arranged to enable connection of any of its four inputs to any of its four outputs in dependence on the instruction being performed. The upper two outputs of the multiplexers 9 form the two inputs to a multiplier (mult) 11a the output of which is connected to a multiplier shifter (mult shift) 12 which performs bit shifting of the multiplier output. (For example, if the inputs to the multiplier 11a are 32 bits wide, the multiplier output can be up to 64 bits, and the multiplier shifter 12 selects the required 32 bits to be supplied to its output in accordance with the instruction being performed). The output of the multiplier shifter 12 is supplied to an arithmetic logic unit (ALU) 13. One input of the multiplier 11 is also connected directly to an input of the ALU 13, as is the third output of the multiplexers 9. The output of the ALU 13 is connected to one input of a multiplexer 14 the output of which is connected to the data inputs D of the three data RAMs 7a, 7b and 7c.

The fourth output 15 of the multiplexers 9 is connected via a parity generator 8, which generates parity bits for outgoing data, to first and second I/O (input/output) means 16H and 16V. The I/O means 16H, 16V connect the processor for data transfer with the horizontal and vertical data buses H,V respectively. As shown in more detail in FIG. 3b, I/O sections 16H, 16V comprise respective output data paths 17H, 17V and respective input data paths 18H and 18v. The output 15 of the multiplexers 9 is connected to the output data paths 17H and 17V. Connected in the output data path 17V is a register (V OUT REG) 19V and an output driver 20V, the output of which is connected to the vertical bus (V BUS). On the input data path 18V, the vertical bus is connected via an input buffer 21V to a register (V IN REG) 22V. The data paths 17H and 18H of the I/O section 16H are connected to the horizontal bus (H BUS) and are similarly coinstructed with corresponding registers H OUT REG and H IN REG, 19H and 22H, an output driver 20H and an input buffer 21H. The outputs of the registers 22H and 22V in the input data paths are connected to a parity check unit 25 in which parity checking of data received from the buses is performed. The output of the parity check unit 25 forms a second input to the multiplexer 14.

Figure 1:
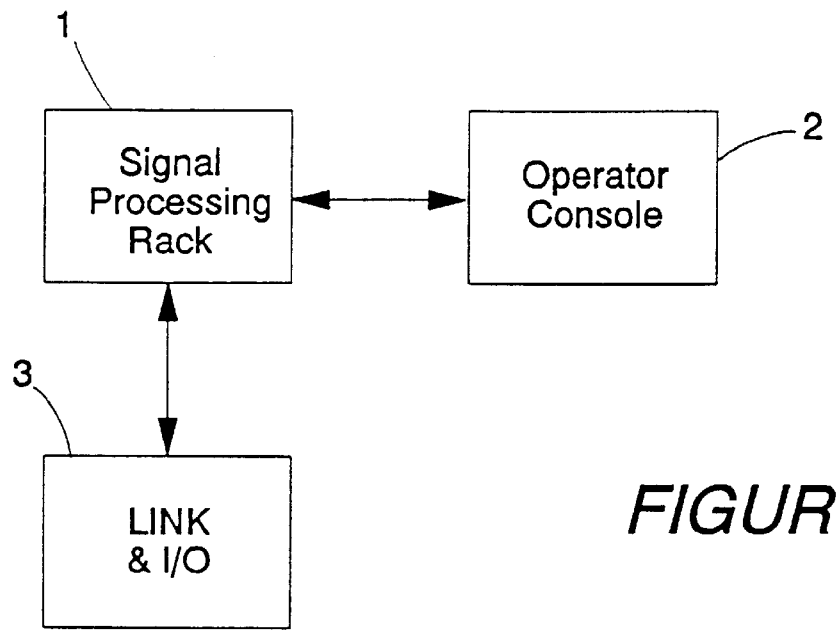
FIG. 1 is a schematic block diagram of a digital audio data processing system.

Each SPIC 4 in the array (FIG. 2) is programmed at set-up to perform a sequence of operations in each audio sample period in accordance with a sequence of instructions stored in the program RAM 5. In the embodiments to be described, each SPIC 4 can implement 512 such instructions per audio sample period. During set-up, the instructions are written to the program RAMs 5 via a control processor, in this example a 68030 processor 26, of which there may be one per card of the signal processing rack 1 (FIG. 1). In operation, the 512 instructions are sequentially read out of the program RAM 5 in accordance with the signal from a clock 27 which generates 512 clock cycles, or "ticks", per audio sample period.

All clocks 27 are synchronised and triggered to start the tick count by a global "start sample clock" which runs at the audio sampling frequency. Thus, all SPICs in the array progress synchronously through their respective instruction sequences during each audio sample period.

The parallel processing array as a whole provides for implementation of all possible processing functions that may be required depending on the set-up of the studio network and the control settings at the operator console 1. To switch in or out a particular function, or to alter the routing of data, the control processor 26 can write directly to the program RAM 5 to change access addresses for the data RAMs 7. For example, to switch in or out a given function, the address accessed by an instruction corresponding to that function can be changed from an address containing processed data to be used when the function is active, to an address containing unprocessed data to be used when the function is switched out.

The control processor 26 is also connected to a coefficient interpolator 11 which generates coefficients (c) to be used in the processing operations of the SPIC from coefficient data supplied by the control processor 26. A separate interpolator 11 is provided for each SPIC 4. The operation of the interpolators will be discussed further below. Coefficients (c) output by the interpolator 11 are supplied to the input 10 of the multiplexers 9.

FIG. 4 illustrates schematically the general format of an instruction word for the instructions stored in the program RAM 5. This instruction word is 48 bits long. The first eight bits of the instruction word form the operation code (OP CODE) which indicates the type of instruction, e.g. add data in two of the data RAMs 7, multiply data in one of the data RAMs by a coefficient, and so on. The next 12 bits of the instruction word constitute control data for controlling the internal operation of the SPIC, e.g. for controlling switching in the MUX block 9 and multiplexer 14, enabling of the data RAMs 7, I/O accesses, including enabling of the output drivers 20H, 20V in the I/O sections 16H, 16V, and so on. The next 28 bits of the instruction word are divided into four 7-bit address fields. The first three address fields represent read addresses for the three data RAMs 7a, 7b and 7c. The last address field represents a write address for writing data to one or more of the data RAMs 7.

Referring again to FIG. 3a, as each instruction word is read out of the program RAM 5, the addresses are supplied to the address calculator 6 which decodes the read and write addresses for the data RAMs 7. The remaining instruction data is output to the control line 30 which is shown in bold in FIG. 3a. In this simplified diagram, the control line 30 is shown connected to the data RAMs 7, MUX block 9, multiplier 11a, multiplier shifter 12, ALU 13, I/O sections 16H, 16V and the multiplexer 14 to control operation of these components in accordance with the instruction word.

The internal hardware of the SPIC 4 is highly pipelined. The pipeline registers are indicated schematically by the dash-dotted lines in FIG. 3a and are labelled P1 to P7. These divide the data and control paths from the program RAM 5, via the data RAMs 7, MUX block 9, ALU 13, and multiplexer 14 back to the data RAMs 7 into eight pipeline stages 0 to 7 as follows:

| Pipeline Stage | Action |
| --- | --- |
| 0 | Program read |
| 1 | Address calculation |
| 2 | Data read |
| 3 | Multiplier 1 |
| 4 | Multiplier 2 |
| 5 | Multiplier shift |
| 6 | ALU |
| 7 | Data write |

Each pipeline stage 0 to 7 corresponds to one tick of the counter 27 which triggers reading of successive instructions from the program RAM 5. Thus, at tick 0 at the start of an audio sample period, instruction 0 is read out of the program RAM 5 to the pipeline register P1. In the next tick, instruction 1 is read out of the program RAM 5 to the pipeline register P1 as address calculation for instruction 0 is performed by the address calculator 6. In successive ticks after this, successive instructions are read out of the program RAM 5 as the instruction data for instruction 0, and data generated by this instruction, propagate through the internal pipeline stages. Note that read addresses generated by the address calculator 6 in pipeline stage 1 are used in the immediately following pipeline stage to access the data RAMs 7, whereas write addresses (wa) generated in pipeline stage 1 are not required until pipeline stage 7. As indicated schematically in FIG. 3a, therefore, write addresses wa are supplied on an extension of the address line from pipeline register P2, on through pipeline registers P3 to P7, and appear on the write address inputs WA of the data RAMs 7 in pipeline stage 7.

Consider for example an instruction requiring multiplication of data at specified addresses in data RAMs 7a and 7b, and writing of the product to a specified address in data RAM 7c. The operation is as follows. In the first tick, the instruction is read out of the program RAM 5. In the second tick, the read addresses for data RAMs 7a and 7b and the write address for data RAM 7c are generated by the address calculator 6. In the third tick, the read addresses are supplied to the data RAMs 7a, 7b which are enabled by the instruction word on the control line 30 so that the appropriate data samples are read out to pipeline register P3. The write address for data RAM 7c is passed on to pipeline register P3 on the address line extension and propagates through the following pipeline stages with successive ticks. In the fourth tick, the MUX block 9 is controlled to supply the data samples read from the data RAMs to the two inputs of the multiplier 11a which then performs the first stage of the multiplication processing. In the fifth tick, the multiplier 11a performs the second stage of the multiplication processing and supplies the product to the pipeline register P5. Bit-shifting of the product is performed by the multiplier shifter 12 in tick 6 under control of the instruction word, and the result is supplied to the pipeline register P6. In the seventh tick, the product is supplied via the ALU 13 to the pipeline register P7. In the eighth tick, the write address wa is supplied to the data RAMs 7 and the multiplexer 14 is controlled to supply the output from the ALU 13 to the data RAMs. During this stage, data RAM 7c is enabled by the control data in the instruction word, whereby the product is written to the appropriate address in this data RAM and the operation is complete.

It will be seen from the above that if instruction 0, read in tick 0, generates a variable X, the data is not written to the data RAMs 7 until the end of tick 7. Thus, the variable X is not available to be used by any other instruction until tick 8. Since an instruction read from the program RAM 5 in tick n can read data from the data RAMs 7 in tick n+2, the first instruction that can use the variable X is instruction 6 which is read from the program RAM 5 in tick 6.

Transfers between SPICs 4 using the H or V buses occur with normal pipeline timing. Thus, if instruction 0 in tick 0 requires the output of data to one of the buses, the data will be supplied to the I/O sections 16H, 16V on the output 15 of the MUX block 9 in tick 3. At the end of this tick, the data will be stored in the output registers 19H and 19V of the I/O sections which therefore correspond to equivalent pipeline registers P4 as indicated in brackets in FIG. 4b. In tick 4, control data in the instruction word enables the appropriate one of the output drivers 20H, 20V via the control line connection to the output sections so that the data will be present on the H or V bus in tick 4.

Figure 3B:
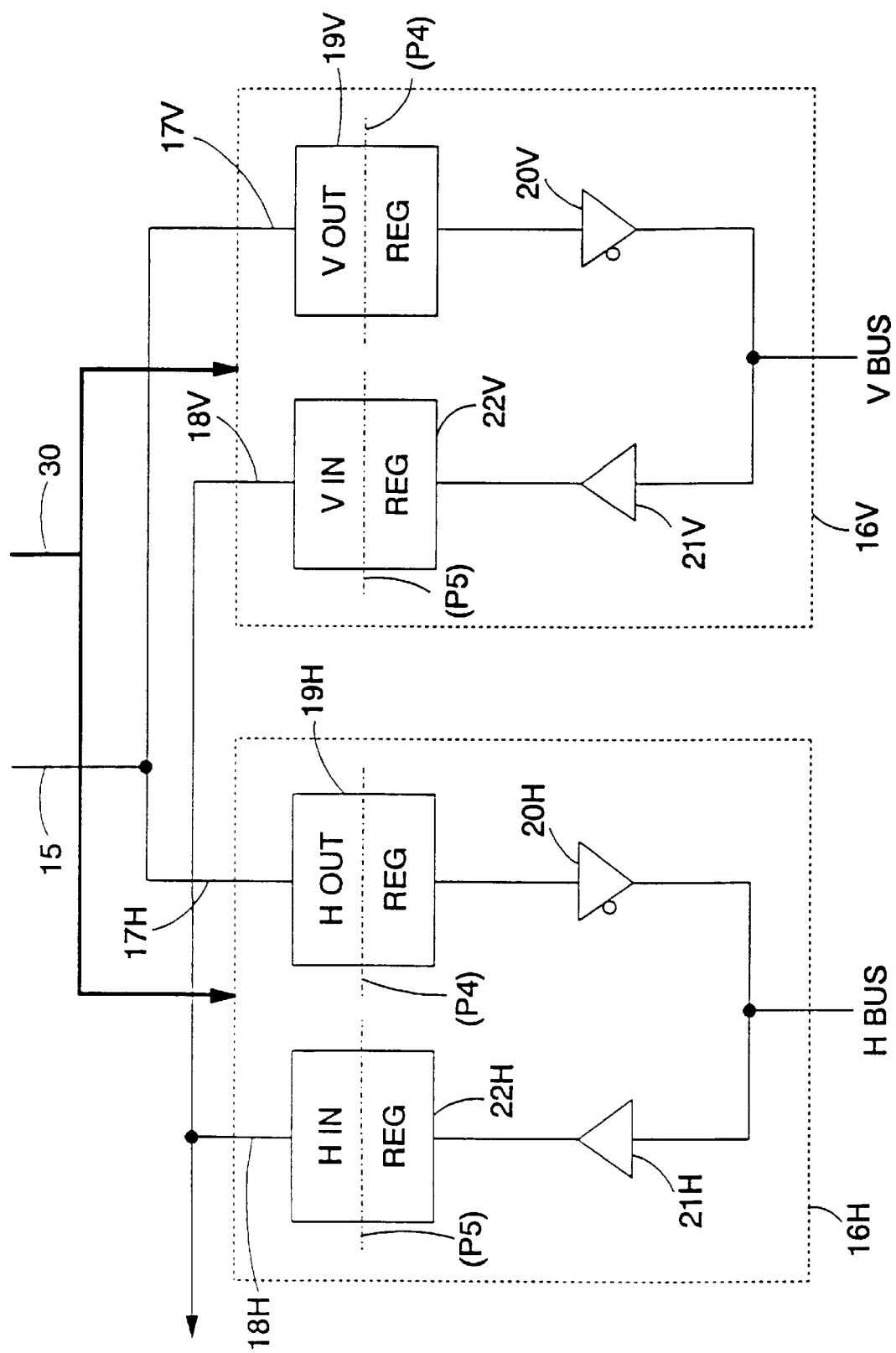
FIG. 3b shows part of FIG. 3a in more detail.

Similarly, for a data input instruction in tick 0, the data will be supplied from the bus to the appropriate one of the input registers 22H and 22V in the I/O sections in tick 4, so that these input registers correspond to equivalent pipeline registers P5 as indicated in brackets in FIG. 3b. In tick 5, the data will be output by the input registers to equivalent pipeline register (P6). In tick 6, parity checking is performed, and in tick 7 the data is supplied by the multiplexer 14 to the appropriate one of the data RAMs 7.

FIG. 5 illustrates diagrammatically the process of communication between two SPICs on the same bus, here SPICs A and C in FIG. 2. In this example, data is to be transferred from SPIC A to SPIC C. In tick 0, instruction 0 is read out of the program RAM 5 in SPIC A specifying output of data from a specified address in one of the data RAMs 7 to the H bus. In the same tick, tick 0, instruction 0 is read out from the program RAM 5 of SPIC C and specifies the input of data from the H bus to a specified address in one of its data RAMs 7. In tick 1, read address calculation is performed by the address calculator 6 in SPIC A and write address calculation is performed by the address calculator 6 in SPIC C. In tick 2, the data is read out from the appropriate address in one of the data RAMs 7 in SPIC A, and the input instruction is supplied to the pipeline register P3 in SPIC C. In tick 3, the data is supplied to the output register 19H in the I/O section 16H of SPIC A and the input instruction is supplied to pipeline register P4 in SPIC C. In tick 4, the output driver 20H in SPIC A is enabled to output the data to the H bus, and the data is received by the input register 22H (corresponding to equivalent pipeline register (P5)) in the I/O section 16H of SPIC C. In tick 5, the data is supplied by the register 22H in SPIC C to the equivalent pipeline register (P6). In tick 6, parity checking is performed by the parity check unit 25 in SPIC C. In tick 7, the data is written to the specified address in one of the data RAMs 7 in SPIC C. Thus, communication between two SPICs on the same data bus takes a total of eight ticks.

In each of the SPICS, a number of the 512 instructions are concerned with processes testing for various events which may occur during operation, for example testing for signal overloads at various points in the system. In a 100-channel console, there may be in the region of 1000 overload detection points in the signal processing rack 1, and each SPIC 4 may have instructions for testing for a signal overload at, say, 10–20 of these points. The detection of such an event must be indicated to the control processor 26 so that appropriate action can be taken. For example, in the case of a signal overload, the control processor may cause an indicator to be lit on the operator console so that the operator can make appropriate adjustments. Accordingly, the SPICs are configured to generate interrupt signals on detection of any of these events, and the interrupt signals are supplied to the control processor 26. Preferred embodiments of the present invention provide a particularly efficient system for generating the interrupt signals, and identifying the sources of the interrupts, i.e. the event causing the interrupts, as will now be described.

In each SPIC 4, the instruction sequence stored in the program ram 5 includes an interrupt test instruction for each event which may require generation of an interrupt on detection of the event by that SPIC. The interrupt test instruction is very similar to an ordinary subtract instruction in that the instruction involves reading of data from two specified memory locations in respective data rams, say 7a and 7b, subtraction of one of these data values from the other in the ALU 13, and writing of the subtraction result to a specified data location in the remaining data ram, say data ram 7c. However, for an interrupt test instruction, the operation code (OP CODE) of the instruction word (see FIG. 4) identifies the instruction as an interrupt test instruction. For example, one bit (an interrupt control bit) of the OP CODE may be set only for interrupt test instructions, and this bit can be used in conjunction with the ALU output for an interrupt test instruction to transmit an interrupt signal to the control processor when, and only when, the ALU output for the interrupt test instruction is non-zero. Alternatively, a particular 8-bit OP CODE may identify the instruction as an interrupt test instruction, and a decoder, for example in the ALU 13 or control line 30, may generate a one-bit output in dependence on the OP CODE, this bit being set only for interrupt test instructions and serving as an interrupt control bit. Again, the interrupt control bit can be used in conjunction with the ALU output to generate an interrupt signal when the ALU output is non-zero. Thus, an interrupt test instruction will result in generation of an interrupt signal by the SPIC when the data values read by the instruction from the two specified data locations are not equal. For this reason, the interrupt test instruction is termed an "interrupt-if-not-equal instruction" (INE instruction) and will be referred to hereinafter as such.

Figure 6:
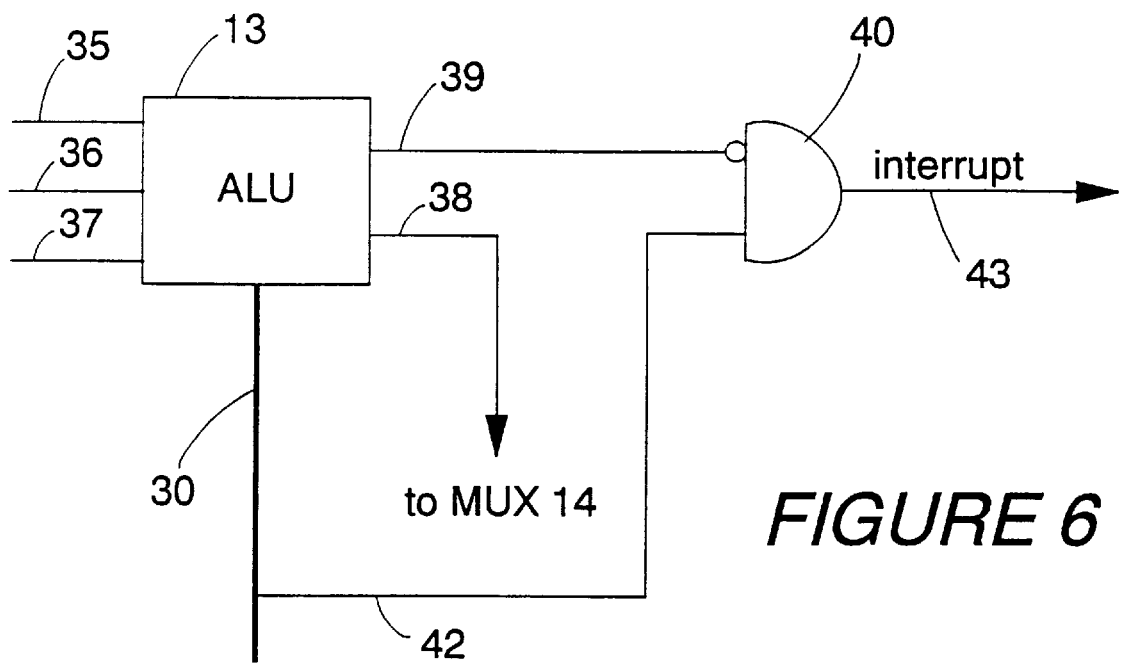
FIG. 6 illustrates in more detail part of the structure of the data processor of FIG. 3a in accordance with a preferred embodiment of the invention.

FIG. 6 illustrates in more detail part of the SPIC 4 of FIG. 3a for generating an interrupt from an INE instruction. FIG. 6 shows the ALU 13 with its three inputs, labelled 35 to 37. Inputs 35 and 37 are connected directly to outputs of the MUX block 9, and input 36 is connected to the multiplier shifter 12 in FIG. 3a. The ALU 13 has an output 38 which is the output shown in FIG. 3a connected to the multiplexer 14. In addition, the ALU has a one-bit output 39 connected to a negated input of an AND gate 40. The control line 30 is connected to the ALU 13 as illustrated in FIG. 6 for controlling operation of the ALU in accordance with the instruction word. However, in this example, a one-bit branch 42 of the control line 30 is connected directly to the second input of the AND gate 40. The output of the AND gate 40 forms an interrupt output 43 of the SPIC 4 for supplying interrupt signals to the control processor 26.

The state of the one-bit output 39 of the ALU 13 is determined by dedicated logic in the ALU 13 in dependence upon data supplied to the two inputs 35 and 37 thereof. In particular, the ALU 13 sets the output 39 to logic 1 whenever data supplied to the inputs 35 and 37 are equal. Otherwise, this output is set to logic 0. At the same time, of course, the result of any arithmetic operation performed by the ALU is supplied to the output 38 as normal. The data supplied to the one-bit branch 42 of the control line 30 is the INE identifier control bit. In this example, it is assumed that one bit of the OP CODE is dedicated to identifying INE instructions, this bit being the control bit supplied to the branch 42 of the control line 30. Equally, however, the INE instruction may be identified by a particular bit pattern of the OP CODE. In this case, a decoder may be provided to generate a one-bit output from the OP CODE, this bit being set only for INE instructions. The decoder may be provided in the control line 30 to supply its one-bit output to the branch 42 in FIG. 6. Alternatively, the decoder could be provided in the ALU 13, a one-bit output for the resulting control bit being connected directly to the second input of the AND gate 40. However generated, since the INE identifier control bit is set only for INE instructions, logic 1 will be applied to the second input of the AND gate 40 when the instruction being implemented is an INE instruction. Thus, the interrupt output 43 will be set to logic 1 only for INE instructions where the data values supplied to the inputs 35 and 37 of the ALU is not equal.

Figure 7:
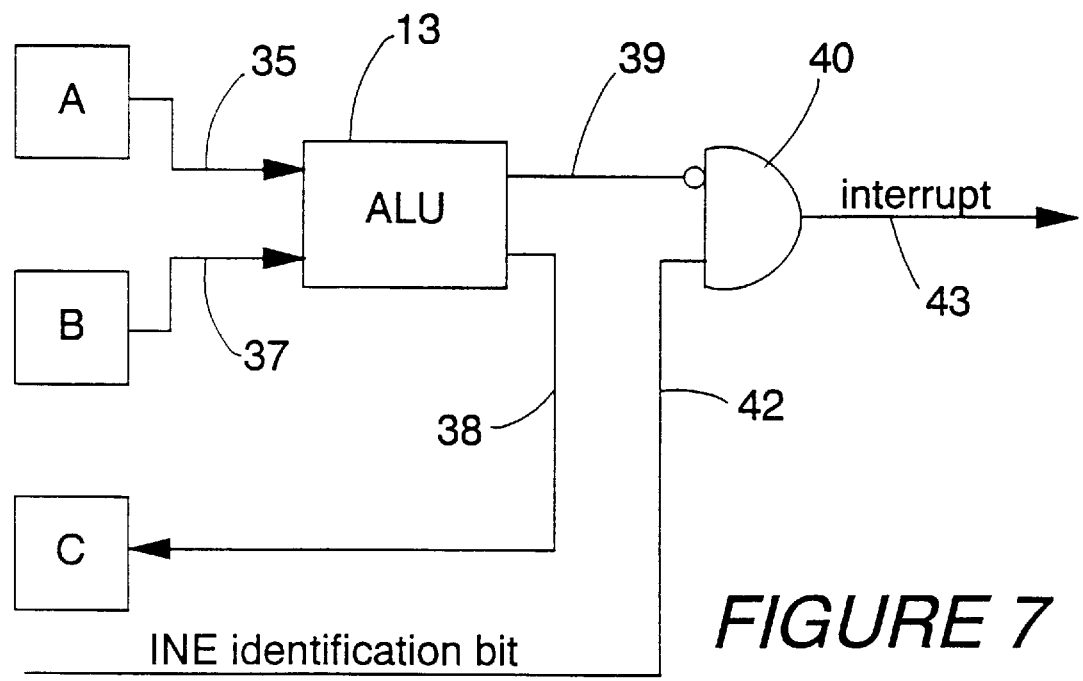
FIG. 7 is a diagram for explaining an interrupt generation process performed by the apparatus of FIG. 6.

FIG. 7 illustrates schematically the operation of the INE process. In this diagram, the blocks labelled A, B and C represent the memory locations in data rams 7a, 7b and 7c respectively which are defined by a particular INE instruction. In particular, A and B are data locations in rams 7a and 7b corresponding to read addresses in the INE instruction, and location C in data ram 7c corresponds to the write address in the INE instruction. In operation, the INE instruction is read from the program ram 5, address calculation is performed, and the data at locations A and B is read from the data rams 7a and 7b. This data is supplied by the MUX block 9, under control of the instruction word, to the MUX outputs connected to the inputs 35 and 37 of the ALU as indicated schematically in the figure. The ALU 13, under control of the instruction data on the control line 30, subtracts the data at location B from the data at location A and supplies the resulting "interrupt data" to the output 38. The interrupt data, i.e. the result of the subtraction, is supplied, via the multiplexer 14, to the data ram 7c and written to location C. As the interrupt data is supplied to the output 38 of the ALU 13, the state of the output 39 is set according to whether the data supplied to the input 35 from location A is equal to data supplied to the input 37 from location B. If the data values are equal, i.e. $data_A - data_B = 0$, the output 39 is set to logic 1, so that, after negation, logic 0 is input to the AND gate 40. However, if $data_A - data_B \neq 0$, logic 1 is input to the AND gate 40. If, at the same time, the INE identification bit on the control branch 42 is set, indicating that the instruction is an INE instruction, then an interrupt signal will be generated on the interrupt output 43.

Thus, the INE instruction provides a simple, all-purpose method of generating an interrupt signal. Whether an interrupt signal is actually generated by an INE instruction depends solely on the data at locations A and B in the data rams 7 when the INE instruction is performed. If the data at these locations is not equal, an interrupt signal will be generated. The testing for an event requiring generation of an interrupt signal can be performed by instructions earlier in the instruction sequence of the SPIC. Under normal circumstances, the data at locations A and B will be equal, so that each time the INE instruction is performed (which is once per audio sample period) no interrupt signal will be generated. However, if the earlier processing operations result in detection of such an event, data can be written to one of the locations A, B such that the data in the two locations is different, and the next implementation of the INE instruction will result in generation of an interrupt signal.

As described above, the interrupt data produced by the INE instruction, i.e. the result of subtracting the data at locations A and B, is written to location C. It will be noted that this data identifies whether an interrupt signal has been generated. This is because the interrupt data will be zero under normal circumstances ($data_A = data_B$), and non-zero only when an interrupt signal is generated ($data_A \neq data_B$). The addresses of the data locations C associated with all INE instructions in a given SPIC are stored in the control processor 26 on set-up. These addresses may be stored in the form of a look-up table, e.g. in a memory of the control processor, which associates the addresses with the particular events the occurrence of which would result in generation of an interrupt signal by the corresponding INE instructions. Thus, for each event which would require generation of an interrupt signal on detection during processing by the SPIC, there is an associated INE instruction the data locations A, B of which are written to if an interrupt signal is to be generated as a result of detection of that event. The data locations C of these INE instructions are tabled in the control processor against the events corresponding to the INE instructions. This provides a particularly convenient means for identifying the source of an interrupt signal received by the control processor 26. In particular, on receipt of an interrupt signal, the control processor need only read all the data locations C for the INE instructions in the particular SPIC, and the interrupt data stored at each of these locations indicates whether the interrupt signal was generated by the corresponding INE instruction. If interrupt data generated by the INE instructions was not written to the third data locations C, then, on receipt of an interrupt signal, the control processor would need to read all pairs of locations A, B for the INE instructions and itself calculate from the data at each pair of locations A, B whether the corresponding INE instruction resulted in generation of the interrupt signal.

Figure 8:
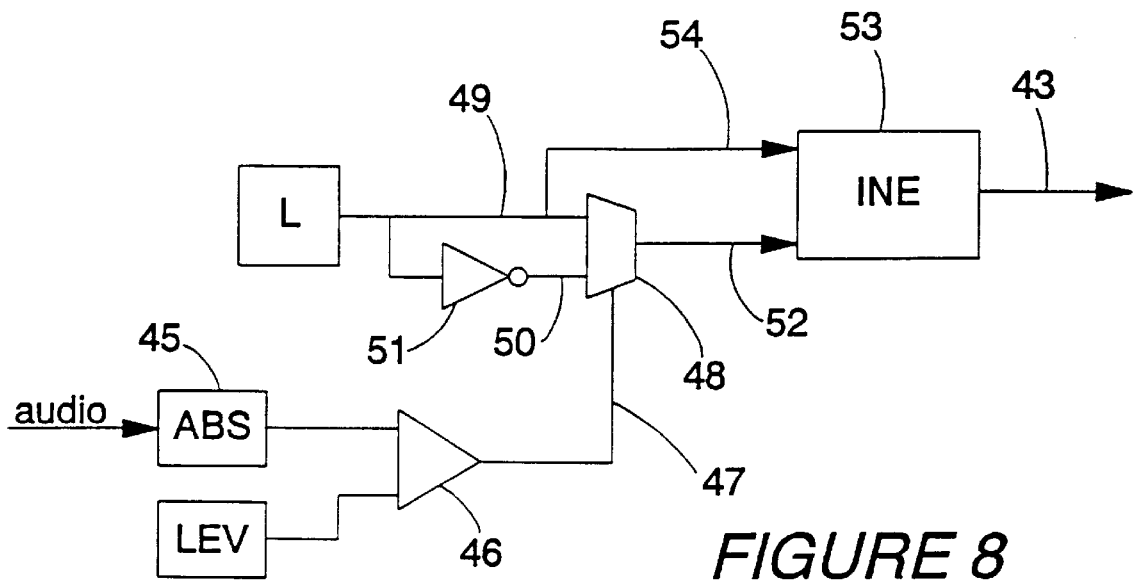
FIG. 8 is a diagrammatic representation of one example of how the interrupt generation process of FIG. 7 may be used in a data processor.

FIG. 8 illustrates one example of how an INE instruction may be used in a SPIC, in this case to generate an interrupt signal indicative of a signal overload. In this figure, the relevant part of the operation of the SPIC is represented in the form of a block circuit diagram with the same function, though of course the operation is in fact performed by the SPIC circuitry in response to various instructions of the instruction sequence stored in the program ram 5. Referring to FIG. 8, the absolute level of audio signals at a particular point in the system is determined by the absolute (ABS) block 45, the output of which forms one input to a comparator 46. A threshold level (LEV) corresponding to the maximum desired signal level is supplied to the other input of the comparator 46. If the output of the ABS block 45 is greater than the threshold level, indicating a signal overload, the comparator 46 outputs a control signal to a control input 47 of a multiplexer 48. The multiplexer 48 has two inputs 49 and 50. Input 49 receives data read out from a data location L of the data rams 7, and this data is also supplied via an inverter 51 to input 50 of the multiplexer 48. The output of the multiplexer 48 forms one input 52 to the INE function block 53, the second input 54 of which is connected directly to the input 49 of the multiplexer 48.

In the absence of a control signal on the control input 47 of the multiplexer 48, (i.e. no signal overload), the input 49 of the multiplexer 48 is connected to the INE input 52. In this condition, both inputs 52, 54 of the INE block 53 receive the data read from the data location L. Since the INE inputs are equal (signifying that the data values at the data ram locations A,B are equal), no interrupt signal is generated on the interrupt output 43. However, on receipt of a control signal at the control input 47, the multiplexer 48 connects its input 50 to the INE input 52. In this condition, the data from location L is supplied to the INE input 54, but this data is inverted on the INE input 52, i.e. data is written to one of the data ram locations A,B such that $data_A \neq data_B$. Since data on the two INE inputs is then not equal, an interrupt signal will be generated on the interrupt output 43. As noted above, the functions just described are in fact implemented by a number of instructions, performed one after the other, in the preprogrammed instruction sequence of the SPIC. Data on the INE inputs 52, 54 in FIG. 8 is the data supplied to the locations A, B defined in the INE instruction, which data is subsequently read by the INE instruction to generate the interrupt data and, if appropriate, the interrupt signal, as described with reference to FIG. 7.

Figure 9:
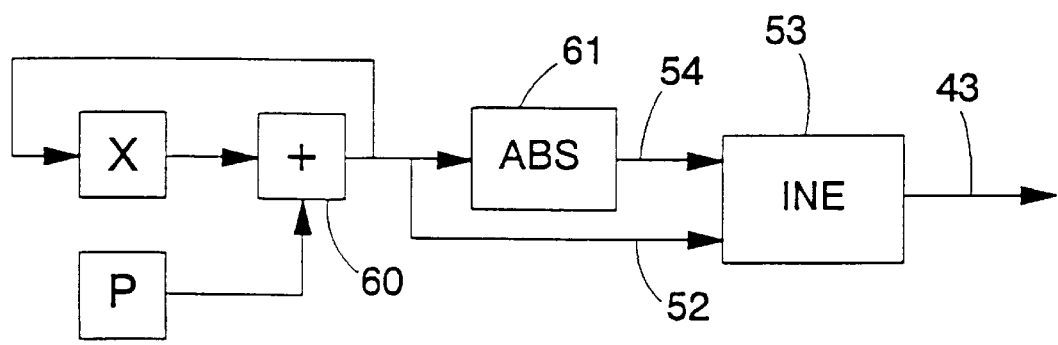
FIG. 9 is a schematic representation of a further example of how the interrupt generation process of FIG. 7 may be used in a data processor.

FIG. 9 illustrates another example of how an INE instruction may be used in the SPIC. In this case, the INE instruction is used to detect the expiry of a preset time period as determined by a timer implemented by the SPIC. Such timers may be required for a number of purposes. For example, on detection of a signal overload, the control processor 26 may trigger an LED on the control console to alert the operator to the signal overload. However, since the duration of the overload may be only a few audio sample periods, the LED must be lit for a period considerably longer than this to be visible to the operator. Accordingly, on detection of a signal overload, a timer may be set running so that, on expiry of a preset period, an interrupt signal is transmitted to the control processor to cause the LED to be switched off. The INE function can be used with such a timer as represented in FIG. 9, where again it will be understood that the functions represented by the diagram are implemented by particular instructions in the preprogrammed instruction sequence of the SPIC 4.

In the figure, the blocks X and P represent memory locations in the data rams 7 of the SPIC. Under normal circumstances, when the timer is not running, zero value data may be stored at location P, and a predetermined positive value, dependent upon the required duration of the timer, is stored at location X. When the timer is to be set running, data value −1 may be written location P. The following operations are then performed in each audio sample period. Data is read from locations X and P and supplied to an adder 60. The output of the adder 60 is written back to data location X and is also supplied to ABS block 61 which supplies the absolute data value to one input 54 of the INE block 53. The output of the adder 60 is also supplied directly to the second input 52 of the INE block 53.

Since the output of the adder 60 is written back to location X, if $data_p = -1$, the value of data at location X will decrease by 1 with each audio sample period during which the instructions implementing the functions just described are performed. After a number of audio sample periods corresponding to the value initially set in the location X, the output of the adder 60 will be negative in the next audio sample period. The negative output of the adder 60 will be supplied to the INE input 52, but the absolute value of this output will be supplied to the INE input 54. At this point, the INE inputs are not equal and the INE instruction will generate an interrupt signal. On receipt of this interrupt signal, the control processor will perform the appropriate control function, and may reset the data values at locations X and P to reset the timer. Note that the timer can be initiated at any time by writing "−1" to location P, and this may be done automatically as a result of a previous processing operation, for example on detection of a signal overload.

It will of course be appreciated that, although in the above embodiment an interrupt-not-equal instruction is used as a particularly simple interrupt test instruction, the instruction could be set up to test for an interrupt condition in a number of different ways, data being written to the memory locations A, B accordingly.

Figure 10:
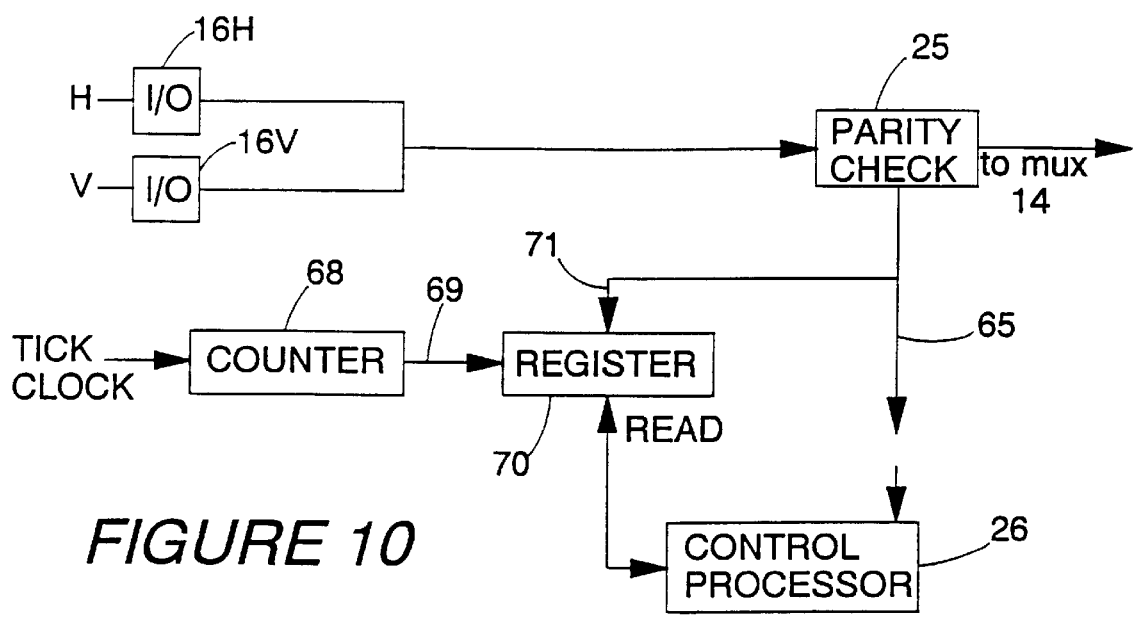
FIG. 10 illustrates in more detail part of the apparatus of FIG. 3a for implementing parity error detection in accordance with a preferred embodiment of the present invention.

As illustrated in FIG. 3a, each SPIC 4 includes a parity generator 8 for applying parity to data to the output to a bus. The parity of all data received from the buses is also checked by the parity check unit 25. FIG. 10 illustrates in more detail part of the processor of FIG. 3a concerned with generation of error signals to alert the control processor 26 to the detection of a parity error.

In FIG. 10, the I/O sections 16H, 16V of the SPIC are shown connected to the parity check unit 25 which checks the parity of incoming data and passes the data on to the multiplexer 14. Parity checking is performed in known manner, and, on detection of a parity error, the parity checker 25 generates a parity error signal, or parity interrupt signal, which is supplied to an interrupt output 65 of the SPIC. The interrupt output 65 is connected to the control processor 26 whereby parity interrupt signals are transmitted to the control processor.

While the fact that a parity error has occurred is communicated to the control processor 26, since each SPIC 4 performs 512 preprogrammed operations in each audio sample period, there may be a great many data inputs to a SPIC per audio sample period, and this complicates the task of identifying the origin of the particular data input in which the parity error occurred. Accordingly, in the preferred embodiment of the FIG. 10, the clock signal from the tick clock 27 (FIG. 3a) is supplied to a counter 68 the count of which is incremented by one for each tick from the tick clock 27. The counter 68 is reset at the end of each audio sample period so that, at any time, the count held by counter 68 indicates the current tick number which in turn corresponds to the number of the instruction currently being read from the program ram 5 of the SPIC. The count held by the counter 68 at any time is supplied to an input 69 of a register 70 which has an enable input 71. On receipt of a signal at the enable input 71, the register 70 latches the count appearing on the input 69.

As illustrated in FIG. 10, the enable input 71 of the register 70 is connected to the parity interrupt output 65 of the parity checker 25. Thus, when a parity interrupt signal is generated by the parity checker 25, this signal appears on the enable input 71 to cause the register to latch the current tick count. Thus, the register 70 stores the number of the tick during which a parity error was detected in data received by the SPIC. As described above, however, in view of the pipelined operation of the SPIC, data received in tick n by the parity checker 25 corresponds to a data input instruction which was read 6 ticks earlier from the program ram 5 of the SPIC. Alternatively, therefore, a count of 6 could be subtracted from the output of the counter 68 by an appropriate subtracter (not shown) connected to the register input 69. In this case, on generation of a parity interrupt signal, the register 70 would store the tick number corresponding to the number of the data input instruction resulting in receipt of the data in which a parity error was detected.

In either case, at the end of an audio sample period during which a parity interrupt signal has been received by the control processor 26 from a particular SPIC, the control processor 26 access the register 70 of that SPIC to read the count stored therein. This count enables the source of the error to be traced. In this preferred embodiment, all communications between the SPICs occurring in different ticks are predefined in the control processor. For example, for each SPIC under control of the processor 26, a look-up table of the SPICs sending data to that SPIC against tick number may be stored in a memory of the control processor. Here, the tick number may correspond to the tick number during which parity checking of the received data is performed, or the number of the input instruction in the receiving SPIC, in dependence upon the count stored by the register 70 is described above. Either way, the control processor can then identify from the count read from the register 70 the SPIC which transmitted the data in which a parity error occurred. Thus, the source of the error can be traced.

The parity error detection system described above can thus be used to identify the source of errors in the system and assist identification of faulty components. In normal use, on detection of a parity error by the control processor 26, the control processor may trigger an indicator on the operator console to indicate that an error has occurred. Data indicating the source of the error, as determined by the control processor 26 from the register count 70 as described above, can then be accessed by an engineer at a later stage. Alternatively, the control processor may simply log the count stored in the register 70 after a parity error has occurred, and the source of the parity error can be determined from this count in a subsequent diagnostic program run.

As mentioned above, during operation of the system, the interpolator 11 generates coefficients c for use by the SPIC 4. The coefficients c can be generated by the interpolator 11 at half the tick rate, so that one coefficient can be generated for each successive pair of instructions read from the program ram 5 of the SPIC. Thus, 256 coefficients can be generated per audio sample period. In the interpolator, the coefficients are generated by interpolation of coefficient data which is supplied to the interpolator by the control processor 26. The control processor 26 receives control signals from the operator console 2 indicating the setting of the various controls. When a setting is changed, the control processor 26 calculates new coefficient data to be supplied to the appropriate interpolators. This new coefficient data is essentially the amounts by which given coefficients are to be incremented over a particular period of time. In an interpolator 11, interpolation of this incremental amount is performed so that the coefficient itself changes gradually over the number of audio samples within the interpolation period. The interpolation period for each coefficient corresponds to the period of a CSR clock which is distributed to all data processors as part of a CSR signal. There are in fact 16 such CSR signals in this particular embodiment, each corresponding to different CSR clock rates. Thus, by selecting different ones of the CSR clocks for controlling the interpolator 11, interpolation of coefficients can be performed over different periods as required to give the desired sensitivity for different functions.

Figure 11:
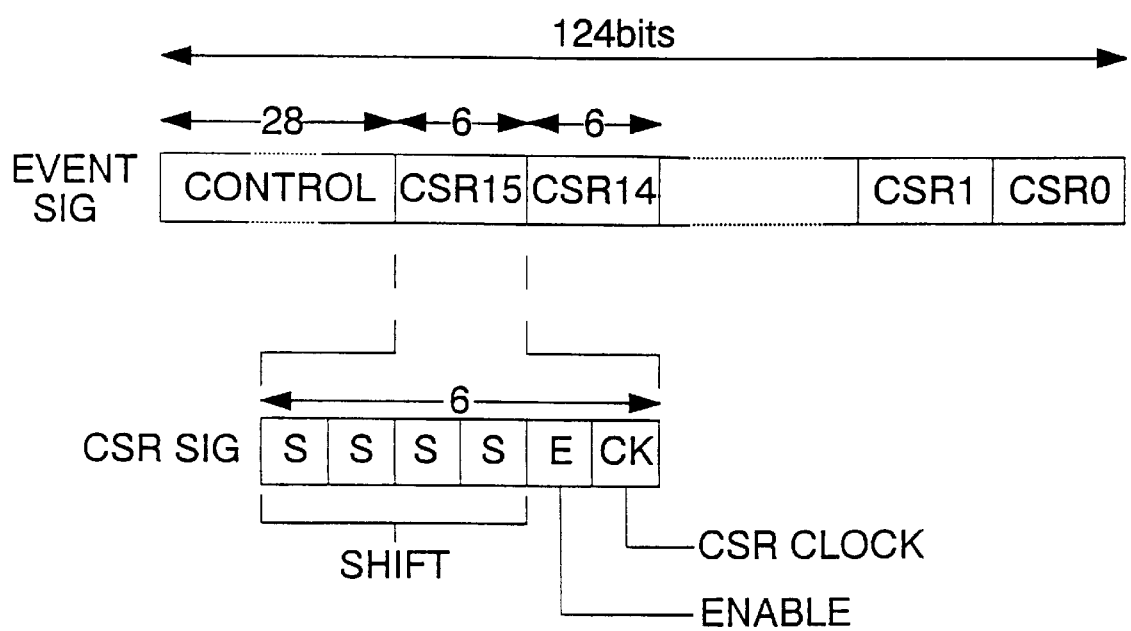
FIG. 11 shows the format of event and CSR signals used in embodiments of the invention.

The 16 CSR signals are generated by a dedicated signal generator of the system and are distributed globally to all data processors 4. The CSR signals are distributed by way of an event signal the general form of which is illustrated in FIG. 11. The event signal is 124 bits long and includes 28 control bits which are used for various control purposes by the data processors. The next 96 bits of the event signal are divided into sixteen 6-bit CSR signals numbered CSR15 to CSR0. The event signal is distributed serially to all data processors 4 in each audio sample period, and is clocked into a 124-bit serial-to-parallel register of the processor so that the bits are available in parallel at the beginning of the next audio sample period.

Each CSR signal has the same general format as illustrated in FIG. 11. The first four bits of the signal are shift bits "S" which indicate the shift, or gain, associated with the signal as will be discussed further below. The fifth bit of the CSR signal is an interpolator enable bit "E" the function of which will also be discussed below. The sixth bit of the CSR signal is the CSR clock bit (CK) itself. The state of this CSR clock bit indicates the state of the CSR clock in a given audio sample period. Thus, the clock bits of a CSR signal in successive audio sample periods constitute a sequence of clock bits forming the CSR clock signal itself. A CSR clock bit is set for one audio sample period in each CSR clock period, so that the number of audio sample periods between set bits of a CSR clock signal corresponds to the CSR clock rate for a given CSR signal. As noted above, the 16 CSR signals have different CSR clock rates, so that the audio sampling rate is a different multiple of each of the CSR clock rates. The CSR signals distributed to each data processor 4 in each audio sampling period are supplied to the interpolator 11 the operation of which will now be described with reference to FIG. 12.

Figure 12:
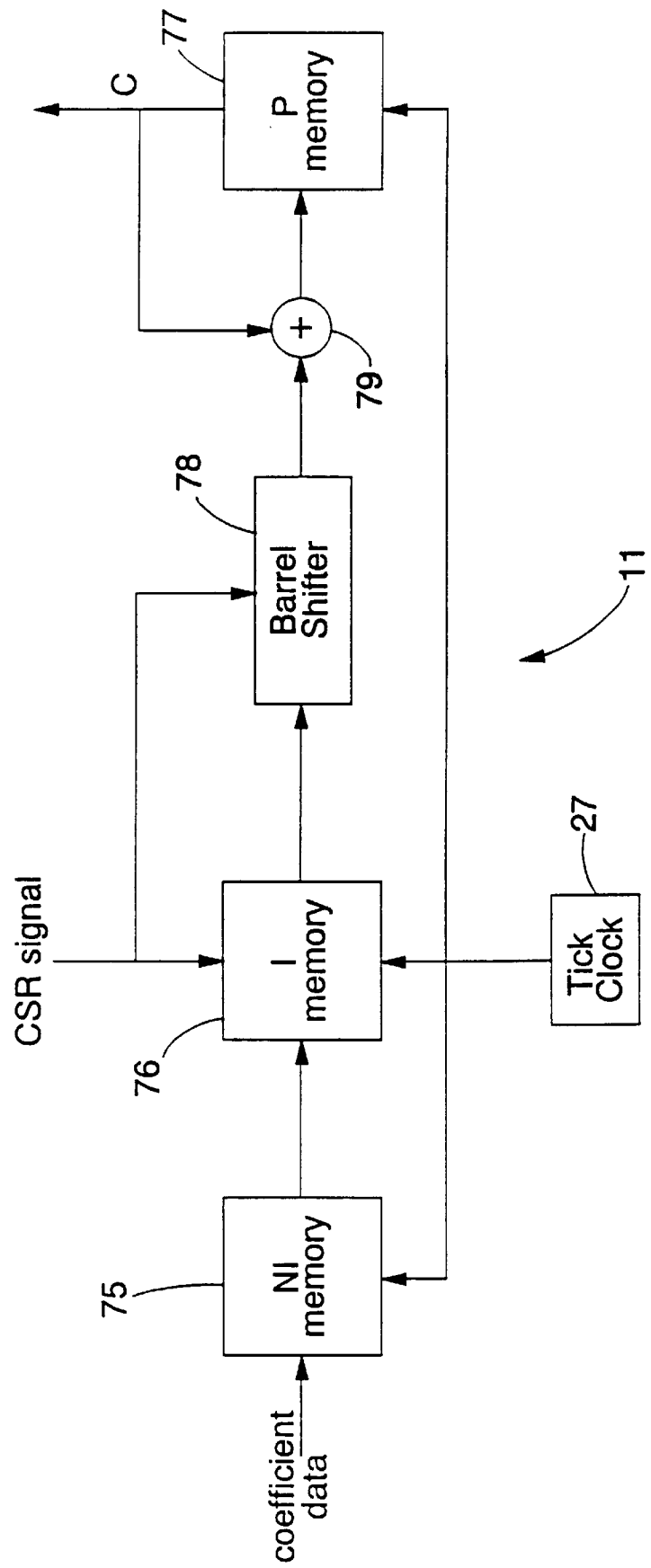
FIG. 12 illustrates in more detail an interpolator of the data processor of FIG. 3a, and FIG. 13 is a schematic illustration of timing interrupt generation means of a preferred embodiment of the invention.

As illustrated in FIG. 12, the interpolator 11 contains three memories, a new increment (NI) memory 75, an increment (I) memory 76, and a present value (P) memory 77. The memories 75 to 77 receive the clock signal from the tick clock 27 which generates 512 ticks per audio sample period as previously described. The memories execute alternate read and write cycles, so that "reads" take place on even ticks and "writes" on odd ticks. Each memory 75 to 77 has 256 memory locations corresponding to the 256 coefficients which can be generated per audio sample period. These memory locations are accessed one after the other every two ticks of the tick clock 27. The actual coefficients c are output on even ticks from successive memory locations of the P memory 77. Thus, in each audio sample period, the first coefficient output by the P memory can be used by instructions 0 and 1 read from the program ram 5, the second coefficient can be used by instructions 2 and 3, and so on.

The output of the I memory 76 is connected to the P memory 77 via a barrel shifter 78 and an adder 79. The coefficient output of the P memory 77 forms a second input to the adder 79. In operation, when a particular coefficient c used by a particular instruction of the SPIC is to be changed, the control processor 26 generates coefficient data indicating the amount by which the coefficient is to change over a period of the appropriate CSR clock. The control processor 26 has stored therein, for example in a PROM, a table of the interpolator memory locations to which different coefficient data is to be written. The control processor 26 thus writes the coefficient data directly to the appropriate location of the NI memory 75. This coefficient data, or incremental value, will be loaded to the corresponding location of the I memory 76 at the next cycle of the appropriate CSR clock.

All 16 CSR signals are supplied to the interpolator 11 in each audio sample period. However, for each of the possible 256 coefficients to be generated in that period, the appropriate CSR signal is selected. The clock and enable bits CK, E of this CSR signal are supplied to the I memory 76, and the four shift bits S are supplied to the barrel shifter 78. Switching between CSR signals in the interpolator is performed under control of particular control bits in the instruction word. Specifically, for each pair of instructions in the program ram 5 that can utilise a given coefficient c, control bits in the pair of instruction words identify the particular CSR signal CSR0 to CSR15, which is used for interpolation of the new coefficient values.

When a new incremental value has been written to a particular location of the NI memory 75, this value will be loaded to the corresponding location of the I memory 76 on the next pulse of the CSR clock for the coefficient c corresponding to that memory location. In the next audio sample period, at the tick count corresponding to that memory location, the incremental value will be output by the I memory 76 to the barrel shifter 78 in which the incremental value is shifted by an amount determined by the four shift bits S of the CSR signal. These shift bits S cause shifting of the incremental value by an amount dependent upon the ratio of the audio sample rate to the particular coefficient clock rate. Specifically, if the ratio between the audio sample rate and the coefficient clock rate is R:1, the barrel shifter 48, under control of the shift bits S, divides the incremental value from the I memory 76 by R. The resulting divided or shifted incremental value output by the barrel shifter 78 is thus the amount by which the present coefficient value must be incremented for each audio sample period within one period of the CSR clock, so that the coefficient c will be changed to the correct new value over one period of the CSR clock. The shifted incremental value output by the barrel shifter 78 is added to the present coefficient c output by the P memory 77 and written back to that coefficient location of the P memory. Thus, in the next audio sample period, the output coefficient will be the old coefficient plus the shifted incremental value.

The function of the interpolator enable bit E is to allow certain pulses of the CSR clock to be switched out to simulate a lower CSR clock rate. For example, if the enable bit E is set for alternate periods of the CSR clock, every other pulse of the CSR clock is switched out and a clock rate of half the actual CSR clock rate is simulated. Thus, the enable bit E allows the effective range of CSR clocks rates to be extended.

It will be appreciated that, where coefficient data corresponding to related operations of a group of SPICs is to be updated, the coefficient data must be supplied to the NI memories of the relevant interpolators 11 so that all the SPICs start using the new coefficient values in the same audio sample period. An example of this is where instructions in a group of SPICs implement a multi-tap or multi-pole filter. Clearly, if the coefficients of the filter are to be changed, all SPICs in the group must start using the new coefficient values in the same audio sample period to avoid distortion. Thus, the control processor 26 must supply the coefficient data to the interpolators between cycles of the appropriate CSR clock. In preferred embodiments of the present invention, the timing of supply of updated coefficient data by the control processor to the interpolators is achieved in the following manner.

Figure 13:
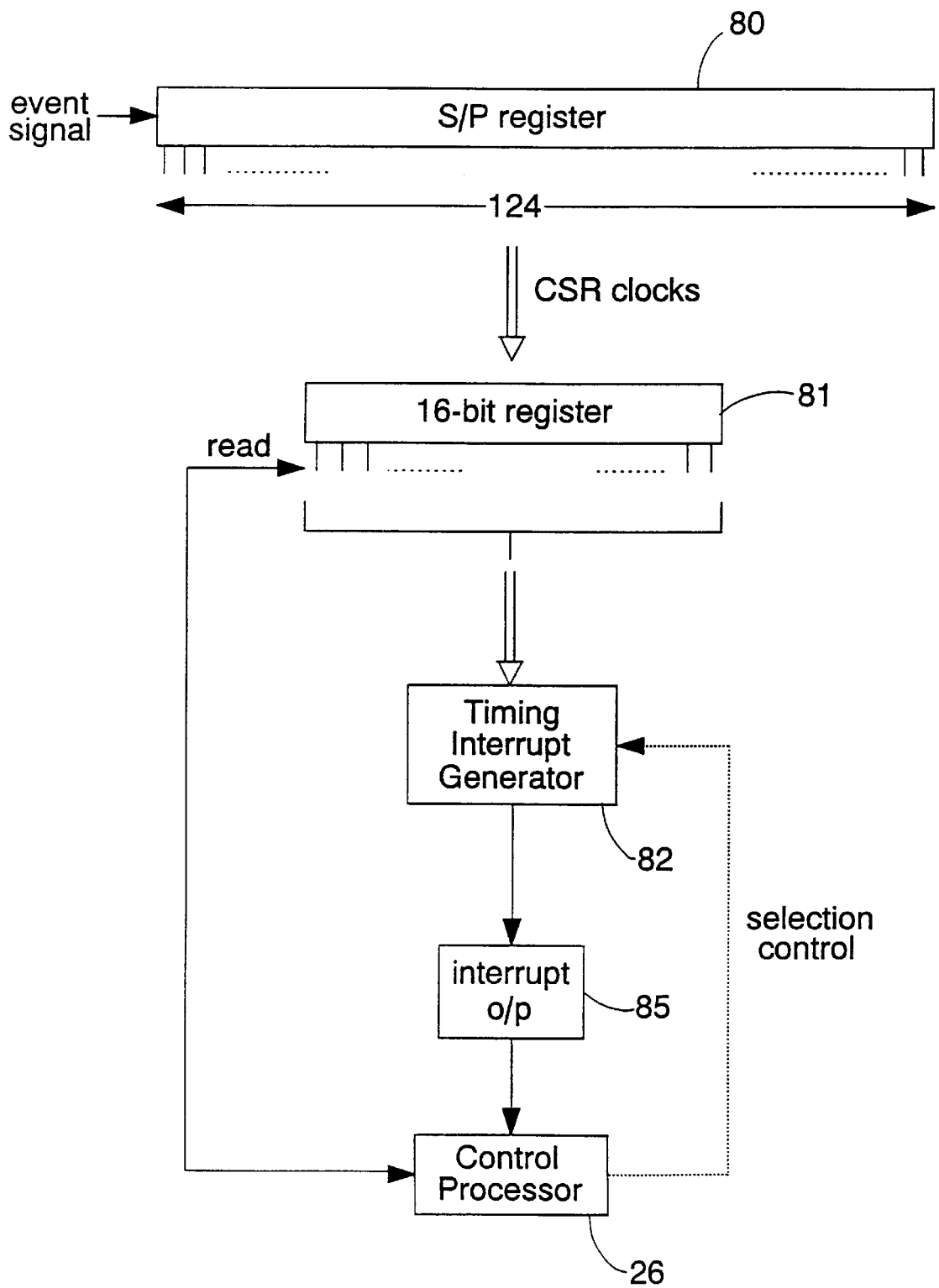

As described above, the 16 CSR signals are distributed to all data processors via the global serial event signal in every audio sample period. In each SPIC, the CSR clocks are extracted from the event signal and one or more of these clocks are used to generate timing interrupt signals which are transmitted to the control processor 26. The timing interrupt signals trigger the control processor to supply updated coefficient data to the interpolators. FIG. 13 illustrates schematically the means for generating timing interrupt signals in a data processor 4. A serial to parallel (S/P) register 80 of the processor receives the event signal so that the 124 bits of this signal are then available in parallel at the start of the next audio sample period. The outputs of the S/P register 80 are connected to the appropriate components of the processor 4. For example, the CSR signals, CSR0 to CSR15 are supplied to the interpolator 11 as previously described. However, the outputs of the particular stages of the register 80 containing the clock bits of the CSR signals are connected to the inputs of a 16-bit parallel register 81. Thus, in each audio sample period, the register 81 stores the current clock bit of each of the 16 CSR clock signals. The outputs of the register 81 are connected to a timing interrupt generator 82 which generates a timing interrupt signal in dependence upon the state of a selected one or ones of the clock bits. In general, two or three of the CSR clock signals may be preselected for generation of timing interrupt signals. The particular selection is set in the timing interrupt generator 82 under control of the control processor 26 as indicated by the broken control line 84 in FIG. 13.

In the timing interrupt generator 82, the outputs of the 16-bit register 81 corresponding to the selected clock signals are connected via an OR gate (not shown) to a timing interrupt output 85 of the processor 4. Thus, in any audio sample period, a timing interrupt signal will be generated if any one of the clock bits of the selected clock signals are set to logic 1, indicating the start of a new cycle of that CSR clock. The timing interrupt output 85 is connected to the control processor 26 which, on receipt of a timing interrupt signal, reads the data stored in the 16-bit register 81 of the SPIC to identify, from the states of the 16 bits therein, which of the CSR clock signals resulted in generation of the timing interrupt. Having thus detected the start of a new cycle of the CSR clock(s), the control processor 26 can then write (for example in the next audio sample period) updated coefficient data to appropriate ones of the interpolators 11. The updated coefficient data is then stored in the NI memories 75 of the interpolators ready for the next cycle of the CSR clock(s) so that coefficients corresponding to related functions will be updated sample-synchronously.

As described above, interpolation of coefficients may be performed over any one of the 16 CSR clock periods. However, it is not necessary to generate timing interrupt signals from all of the CSR clocks. The reasons is that, while it is important to ensure that new coefficients for related instructions in different SPICs are introduced sample-synchronously, it is not necessary for updating of coefficient data (new incremental values) to be introduced immediately a control setting is changed. Thus, even though a particular set of coefficients may be interpolated in accordance with a given CSR clock signal, once the control processor 26 has calculated new incremental values for those coefficients in response to adjustment of a control setting, the new coefficient data does not need to be written to the NI memories 75 of the interpolators before the immediately next cycle of that CSR clock. Rather, a particular one or ones of the CSR clocks can be selected for generation of timing interrupt signals, and these interrupt signals can be used to trigger updates to coefficient data for coefficients corresponding to a number of different CSR clock signals. In practice, as noted above, maybe two or three of the 16 CSR clock signals will be selected for generation of timing interrupt signals.

The selection of clock signals in the timing interrupt generators 82 may be different in different processors, or the selection may be the same in some or all of the processors. Although this may result in a certain amount of redundancy, in that timing interrupts may be generated by more than one SPIC from the same clock signal, the provision of timing interrupt generation means as shown in FIG. 13 in each of the SPICs provides for greater flexibility of the processing system. Also, the timing interrupt generation means can be implemented in silicon in the processing ICs, which is more cost efficient than for example providing dedicated hardware in the control processor 26 for timing of updates to coefficient data.

While the interrupt outputs 85 of the SPICs 4 may be independently connected to the control processor 26, these outputs may be connected via an OR gate (not shown) to a single timing interrupt input of the control processor 26. Since the content of the registers 81 in each processor will be the same in any audio sample period, on receipt of a timing interrupt signal the control processor 26 need only read the register 81 of one of the SPICs to determine which clock signal resulted in generation of the interrupt.

As noted above, the selection of clock signals for generation of timing of interrupts can be varied under control of the control processor 26. This again increases flexibility of the system, and also enables timing interrupts to be prevented when not required. For example, on an initial set-up of the system the timing interrupt generators 82 can be set to disconnect all outputs of the registers 81 from the timing interrupt outputs 85 of the SPICs. This ensures that the control processor 26 does not receive unnecessary timing interrupts while preliminary set-up procedures are being performed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Data processing apparatus comprising an array of data processors each arranged to execute a sequence of operations in accordance with a sequence of instructions read from a program memory of the data processor in successive cycles of a clock signal, the data processors being connected for communication of data via one or more data buses, wherein each data processor includes:

a parity generator for applying parity to data output to at least one of said data buses;

a parity checker for checking the parity of data received from at least one of said data buses, and for generating an error signal on detection of a parity error; and register means arranged to store a count indicative of the cycle of the clock signal at which a parity error occurs.

2. An apparatus as claimed in claim 1, including a control processor connected to each of the data processors for detecting when said error signal is generated by the connected data processor, the control processor being arranged to read the count stored in the register means of the connected data processor upon detection of said error signal from that processor.

3. An apparatus as claimed in claim 2, wherein the control processor is arranged to control a display to indicate the occurrence of an error on detection of an error signal from one of said data processors.

4. A digital audio data processing apparatus including apparatus as claimed in claim 1.

5. Data processing apparatus comprising an array of pipelined data processors each arranged to execute a sequence of operations in accordance with a sequence of instructions read from a program memory of the data processor in successive cycles of a clock signal, the data processors being connected for communication of data via one or more data buses, wherein each data processor includes:

a parity generator for applying parity to data output to at least one of said data buses;

a parity checker for checking the parity of data received from at least one of said data buses, and for generating an error signal on detection of a parity error; and register means arranged to store a count representing the cycle of the clock signal corresponding to the time at which the instruction result in to the parity error was read from the program memory of the data processor.

6. Data processing apparatus comprising an array of data processors each arranged to execute a sequence of operations in accordance with a sequence of instructions read from a program memory of the data processor in successive cycles of a clock signal, the data processors being connected for communication of data via one or more data buses, wherein each data processor includes:

a parity generator for applying parity to data output to at least one of said data buses;

a parity checker for checking the parity of data received from at least one of said data buses, and for generating an error signal on detection of a parity error;

register means arranged to store a count indicative of the cycle of the clock signal at which a parity error occurs; and a control processor connected to each of the data processors for detecting when said error signal is generated by the connected data processor, the control processor being arranged to read the count stored in the register means of the connected data processor upon detection of said error signal from that processor;

wherein the communications between data processors which involve transmission of data from one of said data processors to at least one other of said data processors via one or more of said data buses and which occur in different cycles of the clock signal are predefined in the control processor, and the control processor identifies from the count read from the register means the data processor which transmitted the data in which a parity error has been detected.

7. Data processing apparatus comprising an array of data processors each arranged to execute a sequence of operations in accordance with a sequence of instructions read from a program memory of the data processor in successive cycles of a clock signal, the data processors being operable to execute the respective sequences of operations once in each data sampling period during operation of the apparatus and being connected for communication of data via one or more data buses, wherein each data processor includes:

a parity generator for applying parity to data output to at least one of said data buses;

a parity checker for checking the parity of data received from at least one of said data buses, and for generating an error signal on detection of a parity error; and register means arranged to store a count indicative of the cycle of the clock signal at which a parity error occurs.

* * * * *